(12) United States Patent
Berger et al.

(10) Patent No.: US 8,327,640 B2
(45) Date of Patent: Dec. 11, 2012

(54) ADJUSTMENT DEVICE ON AN EXHAUST-DRIVEN TURBOCHARGER

(75) Inventors: Christian Berger, Stuttgart (DE); Jochen Gückelmann, Salach (DE)

(73) Assignee: Bosch Mahle Turbo Systems, GmbH & Co. KG (DE)

( * ) Notice: Subject to any disclaimer, the term of this patent is extended or adjusted under 35 U.S.C. 154(b) by 757 days.

(21) Appl. No.: 12/358,540

(22) Filed: Jan. 23, 2009

(65) Prior Publication Data
US 2009/0191048 A1    Jul. 30, 2009

(30) Foreign Application Priority Data
Jan. 23, 2008   (DE) .......................... 10 2008 005 656

(51) Int. Cl.
*F02B 33/44* (2006.01)
*F01B 31/00* (2006.01)

(52) U.S. Cl. ........... 60/605.1; 60/324; 60/611; 92/130 R
(58) Field of Classification Search ................. 60/605.1, 60/611, 614, 615, 324; 92/130 R, 94
See application file for complete search history.

(56) References Cited

U.S. PATENT DOCUMENTS

| | | | | |
|---|---|---|---|---|
| 3,991,446 A | | 11/1976 | Mooney et al. | |
| 4,256,019 A | * | 3/1981 | Braddick | ........................... 92/94 |
| 4,403,538 A | * | 9/1983 | Rise | ................................... 92/94 |
| 4,655,043 A | * | 4/1987 | McInerney | ...................... 60/602 |
| 5,727,447 A | * | 3/1998 | Shiraishi et al. | ................ 92/164 |
| 2006/0097215 A1 | * | 5/2006 | Pohn et al. | ..................... 251/327 |
| 2007/0144173 A1 | * | 6/2007 | Noelle et al. | ................. 60/605.1 |
| 2007/0271917 A1 | | 11/2007 | Vogt | |

FOREIGN PATENT DOCUMENTS

| | | |
|---|---|---|
| DE | 1658545 | 7/1953 |
| DE | 1027030 | 3/1958 |
| DE | 2758865 | 11/1986 |
| DE | 3522011 | 1/1987 |
| DE | 102004005001 | 8/2005 |
| DE | 102004058719 | 6/2006 |
| GB | 1104603 | 2/1968 |

OTHER PUBLICATIONS

English abstract for DE-3522011.
English abstract for DE-1020040055001.
English abstract for DE-102004058719.

* cited by examiner

*Primary Examiner* — Quyen Leung
*Assistant Examiner* — Michael Andrews
(74) *Attorney, Agent, or Firm* — Rader, Fishman & Grauer PLLC

(57) ABSTRACT

The present invention relates to an adjustment device (1) for adjusting a valve or a flap, in particular a pressure nozzle for actuating a bypass valve when a limit charge pressure on an exhaust-driven turbocharger is exceeded, which comprises a single- or multi-part housing (2), in particular a housing (2) having a housing lower part (3) and a housing lid. Essential to the invention is that a clip device (4) is provided, by means of which the adjustment device (1) is fastened to a part (6).

20 Claims, 1 Drawing Sheet

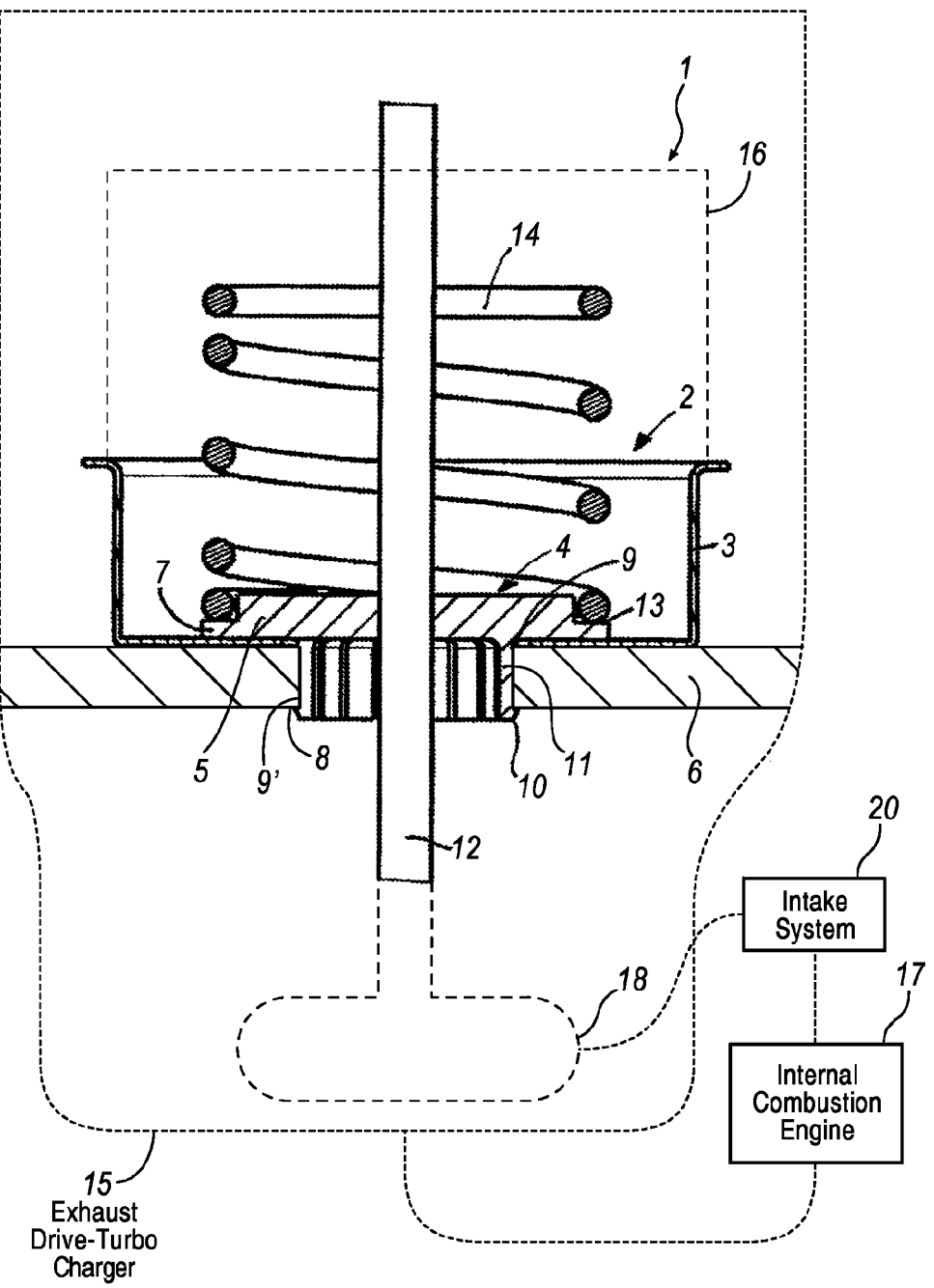

ADJUSTMENT DEVICE ON AN EXHAUST-DRIVEN TURBOCHARGER

CROSS-REFERENCES TO RELATED APPLICATION

This application claims priority to German patent application DE 10 2008 005 656.1 filed on Jan. 23, 2008, which is hereby incorporated by reference in its entirety.

The present invention relates to an adjustment device for adjusting a valve or a flap. The invention also relates to a charging device or an intake system of an internal combustion engine, which device or system is equipped with such an adjustment device.

Adjustment devices, in particular in charging devices which are configured as exhaust-driven turbochargers, are commonly known and usually have the task of opening a bypass line which bypasses the charging device as long as a charge pressure exceeds a predefined limit value. Similarly, adjustment devices are installed in intake systems of internal combustion engines, wherein they are responsible for actuating valves or flaps and help to regulate an intake flow.

DE 10 2004 058 719 A1 discloses a generic adjustment device for adjusting a valve which is installed in a charging device, which is configured as an exhaust-driven turbocharger, and opens a bypass valve when a predefined limit charge pressure is exceeded. This allows in particular an individual reaction to different operating situations of the internal combustion engine. The known adjustment device actuates what is known as a wastegate, that is, a safety or bypass valve, which diverts around the charging device, for example via a bypass line, directly into the exhaust gas system when there is a certain overpressure of the exhaust gas which drives the compressor. This diversion of the exhaust gases reduces the speed of the turbine gas of the charging device, which is transmitted to the compressor wheel so that the latter produces a lower compressor output.

The adjustment device for actuating the wastegate is usually arranged in a metallic housing outside the charging device and connected to the charging device by means of a screw-connection.

The present invention concerns itself with the problem of specifying for an adjustment device of the generic type an improved or at least a different configuration, which in particular considerably simplifies the attachment of the adjustment device to other components.

This problem is solved according to the invention by the subject matter of the independent claims. Advantageous embodiments form the subject matter of the dependent claims.

The invention is based on the general idea of no longer fixing the adjustment device for actuating a valve or a flap to another component by means of a screw-connection but by means of a clip connection. Such a clip connection considerably facilitates assembly, as it is not necessary to tighten a plurality of screws in order to fix the adjustment device, as was previously customary. The omission of these screws means furthermore that a reduction in the number of parts and thus in storage and logistics costs can be achieved. The clip connection according to the invention furthermore allows the assembly time to be reduced, as a result of which costs can likewise be reduced.

In an advantageous embodiment of the solution according to the invention, the clip device has a clip element which has a collar on one side and at least one latching contour on the other side, with which it engages through a through-opening of the housing to such an extent that the collar bears against a housing inner side and the latching contour engages behind a counter-latching contour on the part, for example a latching opening. Such a clip element, which is formed from plastic, can on the one hand be produced in an extremely cost-effective manner and in a variety of shapes and on the other hand ensures a reliable connection of the adjustment device to the associated part, for example to a housing of a charging device.

Expediently the adjustment device has a rod-like adjustment member, which is likewise guided through the through-opening on the housing, with the clip element of the clip device surrounding the adjustment member in an annular manner. The clip element can surround the adjustment member in a close, annular manner such that it at the same time forms a guide for the adjustment member. The clip element of the clip device thus fulfils a plurality of tasks, namely fixing the adjustment device to a part component on the one hand and guiding the rod-like adjustment member on the other hand. It is thus possible to represent both functions by a clip element which can be produced cost-effectively.

In a further advantageous embodiment of the invention the clip element has an annular step which forms a spring seat which is used for holding a spring which adjusts the adjustment member. The annular step further increases the functionality of the clip element according to the invention so that it can now fulfil the task of fastening the adjustment device to another part component, guiding the rod member and holding the spring. The stated functions, which previously had to fulfilled by a plurality of separate parts, can now be assumed by the plastic clip element, which can be produced cost-effectively.

Further important features and advantages of the invention can be found in the subclaims, the drawing and the associated description of the figures using the drawing.

It is self-evident that the features which are mentioned above and those which are still to be explained below can be used not only in the combination specified in each case, but also in other combinations or alone without departing from the framework of the present invention.

A preferred exemplary embodiment of the invention is shown in the drawing and explained in more detail in the following description.

The only FIG. 1 shows a sectional diagram through an adjustment device according to the invention.

In accordance with FIG. 1, an adjustment device 1 according to the invention for adjusting a valve (not shown) or flap (likewise not shown) has a multi-part housing 2, of which only a housing lower part 3 is shown. A housing upper part or housing lid 16 of the housing 2 is shown in phantom, wherein the adjustment device 1 can be configured for example as a pressure nozzle and is used to actuate a bypass valve 18, shown in phantom, when a limit charge pressure on an exhaust-driven turbocharger 15 (shown in phantom) is exceeded. According to the invention, a clip device 4 is now provided with a clip element 5, which is used to fasten the adjustment device 1 to a charging device housing part 6. The clip element 5 of the clip device 4 can for example be configured as an injection-moulded plastic part and can as a result be produced extremely cost-effectively.

As can be seen in FIG. 1, the essentially circular clip element 5 has a collar 7 on one side and at least one latching contour 8 on the other side, with which it engages through a through-opening 9 of the housing 2. The circular clip element 5 other side may be adhesively bonded to the housing 2. The latching contour 8 which projects in the axial direction from the clip element 5 is configured to be so long that it completely engages through a through-opening 9' provided in the part 6 and engages behind an edge of the through-opening 9' in order to fasten the adjustment device 1 to the part 6. The latching contour 8 is configured to be annular and has latching lugs 10 which point radially outwards. These latching lugs 10 are arranged on elastic latching arms 11 which extend in the axial direction and allow a certain radial adjustment movement and thus a guiding of the latching lugs 10 through the through-opening 9' on the part 6. When the adjustment device 1 is completely fastened to the part 6, the collar 7 of the clip element 5 bears against a housing inner side of the housing lower part 3, so that the housing lower part 3 is clamped in a base region and the part 6 is fixed in a region which surrounds the through-opening 9' between the collar 7 of the clip element 5 on one side and the latching contours 8 on the other side.

The adjustment device 1 can, as mentioned in the introduction, be used for adjusting a valve or a flap and to this end have for example a rod-like adjustment member 12 which is likewise guided according to the configuration in FIG. 1 through the through-opening 9 on the housing and through the through-opening 9' on the part 6, with the clip element 5 surrounding the adjustment member 12 in an annular manner. A through-opening 9" in the clip element 5, through which the adjustment member 12 is guided, can be matched to an outer diameter of the adjustment member 12 in such a manner that the clip element 5 at the same time forms a guide for the adjustment member 12.

According to FIG. 1, the clip element 5 has on its axial side which faces away from the part 6 an annular step 13 which forms a spring seat and is used for holding a spring 14 which adjusts the adjustment member 12. The spring 14 is supported against the annular step 13 of the clip element 5 and presses the latter against the base of the housing lower part 3 or against the part 6. Since the adjustment member 12 usually only transfers tensile forces, in all conceivable operating situations the spring 14 causes the clip element 5 to be pressed against the base region of the housing lower part 3. The clip element 5 thus has to absorb virtually no axial forces.

The clip device 4 according to the invention allows the adjustment device 1 to be fastened in a simple and therefore cost-effective manner to the part 6, for example to a charging device, with it being possible for both the parts costs in comparison with a screw-connection of the adjustment device 1 to the part 6 and the assembly costs to be reduced.

As the field of application for such an adjustment device 1, a charging device for example comes into consideration, with the adjustment device 1 opening a bypass valve when a limit charge pressure is exceeded and thus regulating the charge pressure of the charging device. It is likewise conceivable to use the adjustment device 1 according to the invention in an intake system 20 of an internal combustion engine 17 (shown in phantom), with the adjustment device 1 in this case usually regulating an intake air flow.

The invention claimed is:

1. An adjustment device for adjusting one of a valve and a flap, the adjustment device is configured to actuate a bypass valve when a limit charge pressure on an exhaust-driven turbocharger is exceeded, comprising:
a housing having at least a housing lower part and a housing lid; and
a clip device, wherein the adjustment device is fastened to a part by the clip device,
wherein the clip device includes at least one releasable latching arm configured to extend through the housing lower part and a charging device part.

2. An adjustment device according to claim 1, wherein the clip device has a clip element constructed of a plastic material.

3. An adjustment device according to claim 2, wherein the clip element includes two sides, where a collar is on one side of the clip element and at least one latching contour is on the other side of the clip element, wherein the latching contour engages through a through-opening of the housing such that the collar bears against a housing inner side and the latching contour engages behind a counter-latching contour on the part.

4. An adjustment device according to claim 3, wherein the adjustment device has a rod-like adjustment member, which is guided through the through-opening on the housing, with the clip element surrounding the adjustment member in an annular manner.

5. An adjustment device according to claim 4, wherein the clip element, which surrounds the adjustment member in an annular manner, at the same time forms a guide for the adjustment member.

6. An adjustment device according to claim 4, wherein the clip element has an annular step which forms a spring seat and is used for holding a spring which adjusts the adjustment member.

7. An adjustment device according to claim 2, wherein the clip element of the clip device is adhesively bonded to the housing of the adjustment device.

8. An adjustment device according to claim 1, further comprising a charging device that is an exhaust-driven turbocharger for a motor vehicle, which opens a bypass valve when a limit charge pressure is exceeded and thereby regulates the charge pressure.

9. An adjustment device according to claim 1, further comprising an intake system of an internal combustion engine which regulates an intake flow.

10. An adjustment device according to claim 3, wherein the through-opening is a latching opening.

11. An adjustment device according to claim 5, wherein the clip element has an annular step which forms a spring seat and is used for holding a spring which adjusts the adjustment member.

12. An adjustment device according to claim 3, wherein the clip element of the clip device is adhesively bonded to the housing of the adjustment device.

13. An adjustment device according to claim 4, wherein the clip element of the clip device is adhesively bonded to the housing of the adjustment device.

14. A pressure nozzle adjustment device configured to actuate a bypass valve when a limit charge pressure on an exhaust-driven turbocharger is exceeded, comprising:
a housing having a through-aperture configured in a housing lower part; and
a clip device attached to and extending through the housing lower part, the clip device includes a collar on a first side and at least one releasable elastic latching arm extending in an axial direction from an opposite side, the latching arm includes an annular latching contour, which extends radially outwards from the latching arm, wherein the latching arms selectively adjust radially for guiding insertion into the through-opening and into an aperture in a charging device housing part to fasten the adjustment device to the charging device housing part.

15. An adjustment device according to claim 6, wherein the clip element of the clip device is adhesively bonded to the housing of the adjustment device.

16. An adjustment device according to claim 2, further comprising a charging device that is an exhaust-driven turbocharger, which opens a bypass valve when a limit charge pressure is exceeded and thereby regulates the charge pressure.

17. An adjustment device according to claim 14, the charging device is an exhaust-driven turbocharger, which opens a bypass valve when a limit charge pressure is exceeded and thereby regulates the charge pressure.

18. An adjustment device according to claim 2, further comprising an intake system, which regulates an intake flow.

19. An adjustment device according to claim 14, further comprising an intake system, which regulates an intake flow.

20. An adjustment device according to claim 14, wherein the clip device has a clip element, adhesively bonded to the housing of the adjustment device.

* * * * *

UNITED STATES PATENT AND TRADEMARK OFFICE
CERTIFICATE OF CORRECTION

PATENT NO. : 8,327,640 B2
APPLICATION NO. : 12/358540
DATED : December 11, 2012
INVENTOR(S) : Berger et al.

It is certified that error appears in the above-identified patent and that said Letters Patent is hereby corrected as shown below:

On the Title Page, item (75), the second Inventor Jochen Gückelmann should be Göckelmann.

Signed and Sealed this
Third Day of June, 2014

Michelle K. Lee
*Deputy Director of the United States Patent and Trademark Office*